July 7, 1959
G. KRONACHER
2,894,256
DUAL PHASE SHIFT CONVERSION CIRCUITS
Filed July 31, 1956
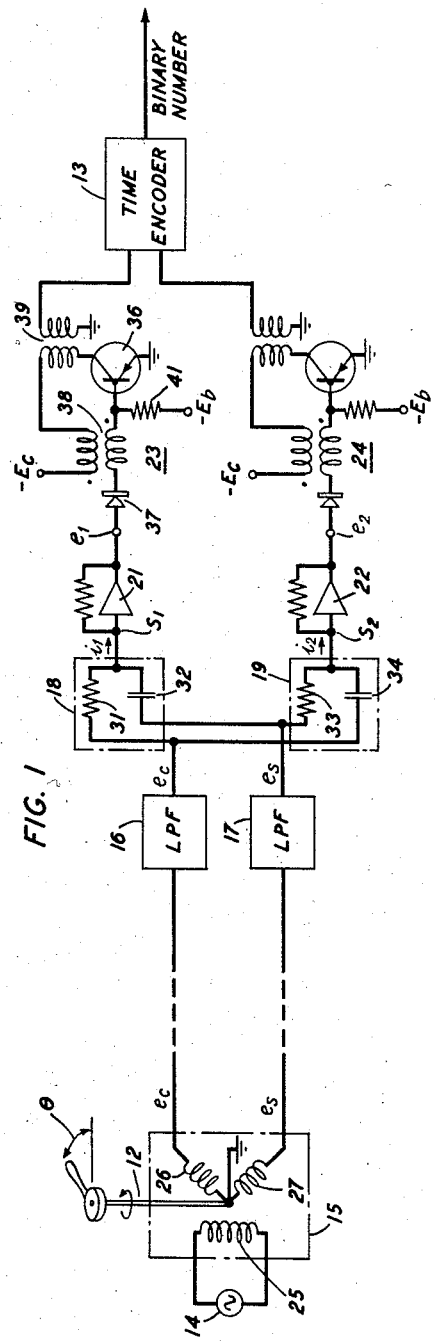
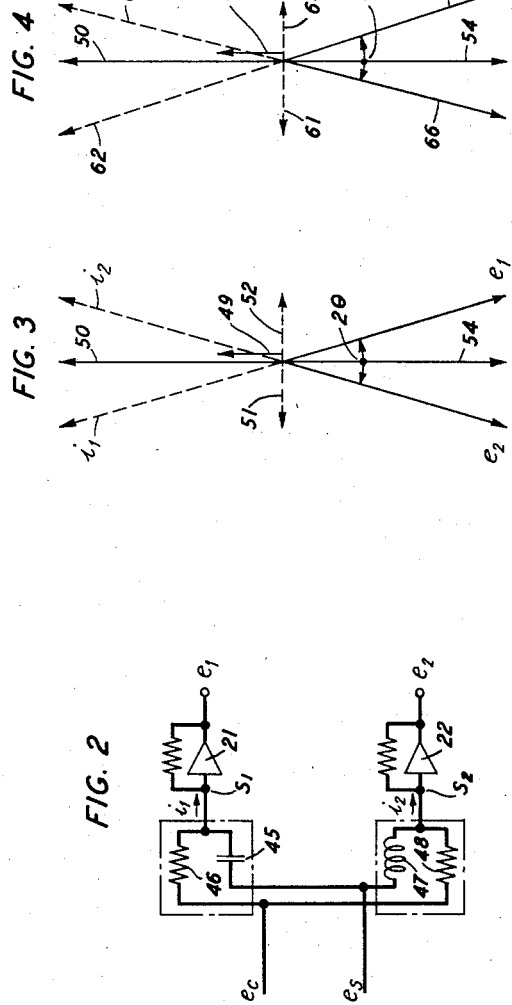
INVENTOR
G. KRONACHER
BY Alan C. Rose
ATTORNEY United States Patent Office 2,894,256
Patented July 7, 1959

2,894,256

DUAL PHASE SHIFT CONVERSION CIRCUITS

Gerald Kronacher, Newark, N.J., assignor to Bell Telephone Laboratories, Incorporated, New York, N.Y., a corporation of New York Application July 31, 1956, Serial No. 601,270

6 Claims. (Cl. 340—347)

This invention relates to conversion circuits and more specifically to circuits for converting amplitude ratios into voltages which are displaced in phase with respect to each other.

In the operation of digital computers or data processing apparatus, a common operation is the conversion of analog input information into digital form. One type of analog-to-digital converter employs a resolver, a phase shifter, and a digital phase measurement circuit. The resolver may include primary and secondary windings which are movable with respect to each other. An alternating current signal is applied to the primary winding. The secondary winding may include two interconnected coils which are oriented at right angles with respect to each other. Two output signals are induced into the secondary winding, the amplitude of one being proportional to the sine, and the other proportional to the cosine of the angle between the primary and secondary windings. The two output signals from the secondary winding are combined in a phase shifting network. The amount of phase shift of the combined voltage is proportional to the angle between the primary and secondary windings. The difference in phase between the phase shifted signal and the primary input signal is then encoded into digital form.

Although the system described in the preceding paragraph is satisfactory for applications where limited accuracy is required, practical systems employing converters of this type have only been accurate within about ±10 minutes of arc, in terms of the angular rotation of a movable shaft to which one of the windings of the resolver is secured. There are a number of factors which contribute to the relatively low accuracy of such systems. For example, the phase relationship between the primary and secondary terminal voltages of the resolver is temperature-sensitive. In addition, slight variations in signal frequency produce variations in phase shift which are not derived from the relative rotation of the resolver windings.

Accordingly, an important object of the present invention is to improve the accuracy of analog-to-digital converters.

Another object is the improvement of circuits for converting alternating current signal amplitude ratios into alternating current signals having corresponding relative phase shifts.

In accordance with the present invention, the foregoing objects are attained by the use of (1) a resolver for obtaining two output voltages which are substantially in phase but which differ in amplitude in accordance with a shaft position, (2) a dual phase shifting circuit for obtaining signals which are shifted in phase equally and oppositely in accordance with the relative amplitude of the two output voltages from the resolver, and (3) a phase measurement circuit for determining the relative phase shift between the signals developed by the dual phase shifting circuit.

The dual phase shifting circuit constitutes an important feature of the invention. By employing circuits which produce equal and opposite phase shifts in accordance with the ratio of the signals on two input circuits, many errors are eliminated. For example, if the frequency of the standard signal source varies slightly, the amount of phase shift produced by one circuit decreases, but the amount of phase shift in the opposite direction produced by the other circuit increases by approximately the same amount. The difference in phase shift between the two output signals therefore remains substantially constant. Other errors, such as that which might otherwise be produced by a quadrature voltage component (which may result from imperfections in the resolver), are also cancelled out in the two phase shifting circuits. In addition, the magnitudes of both output signals from the resolver are affected in the same manner by temperature variations, and this additional source of errors is therefore eliminated.

Other objects, features, and advantages of the invention may be readily apprehended from the following detailed description, from the drawings, and from the claims.

In the drawings:

Fig. 1 is a schematic diagram of an analog-to-digital converter in accordance with the invention;

Fig. 2 is a circuit diagram of an alternative dual phase shifting circuit which may be employed in the converter of Fig. 1;

Fig. 3 is a vector diagram of the voltages and currents at various points in the circuit of Fig. 2; and Fig. 4 is a vector diagram indicating the changes which would result from a slight frequency shift in the primary signal source.

With reference to the drawings, Fig. 1 is a schematic drawing of a complete system for converting analog signals in terms of the angular position of a shaft 12 into a binary number at the output of the time encoder 13. The system also includes a standard source of signals 14, a resolver 15, two low pass filters 16 and 17, two phase shifting circuits 18 and 19, and the summing amplifiers 21 and 22.

Signals are applied to the input winding 25 of the resolver 15 from the standard signal source 14. The signal source may, for example, have a frequency of about 488 cycles per second. The resolver 15 also includes a secondary winding having two output coils 26 and 27 which are at right angles with respect to each other. As the shaft 12 is rotated, the output winding is rotated with respect to the input winding 25, and the relative amplitude of the output signals picked up by coils 26 and 27 is accordingly varied. The amplitude of the signals $e_c$ and $e_s$ picked up by the coils 26 and 27 are proportional to the cosine and sine, respectively, of the rotor angle $\theta$.

One device which may be employed as resolver 15 in Fig. 1 is disclosed in G. Kronacher Patent 2,866,913, issued December 30, 1958, and entitled "Multipole Pair Resolver." Other known types of resolvers, such as those employing capacitance or resistance elements and producing output voltages proportional to the sine and cosine of the rotor angle (or a multiple thereof), may also be employed.

The low pass filters 16 and 17 which are connected to the output coils 26 and 27 eliminate high frequency distortion. The zero crossing detectors 23 and 24, which will be discussed in detail later, could operate falsely as a result of noise and harmonic distortion. The presence of the low pass filters 16 and 17 eliminates this source of error.

The two phase shifting circuits 18 and 19 produce output signals which are shifted in phase equally and oppositely with respect to the phase of the signals $e_c$ and $e_s$, which are in phase. The impedance of the resistor 31 is equal to that of the capacitor 32 at the frequency of the primary signal source 14. Similarly, the impedance of the resistor 33 is equal to that of the capacitor 34. In the phase shifter 18, $e_c$ is applied to the resistor, and $e_s$ is applied to the capacitor, while the input connections to the phase shifter 19 are reversed. Accordingly, the phase shifter 18 produces a phase shift in one direction, while the phase shifter 19 produces an equal phase shift in the opposite direction.

The summing amplifiers 21 and 22 are connected between the phase shifting circuits 18 and 19, respectively, and their associated zero crossing detectors 23 and 24. The summing amplifiers isolate the phase shifters from the zero crossing detectors, and have the low output impedance required to drive the zero crossing detectors. Suitable summing amplifier circuits are disclosed in an article by Franklin H. Blecher entitled "Transistor Circuits for Analog and Digital Systems," which appeared at pages 295 through 332 of the Bell System Technical Journal for March 1956.

The purpose of the zero crossing detection circuits 23 and 24 and the time encoder 13 is to produce a digital indication of the amount of phase shift between the signals appearing at the outputs of the phase shifting circuits 18 and 19. The zero crossing detectors produce electrical pulses at the instant when the applied signal crosses through the zero voltage level from negative to positive.

The zero crossing detector 23 includes a p-n-p transistor 36, an input diode 37, two transformers 38 and 39, and a resistor 41 for supplying base-to-emitter biasing current. When the input voltage applied to the diode 37 from the summing amplifier is large and negative, the silicon diode 37 is an open circuit and the junction transistor 36 has a collector current determined by the base-to-emitter biasing current and the collector circuit constants. Under these circumstances, the base of the transistor is at a potential of approximately —0.2 volt. As the input voltage to the diode 37 approaches zero, the reverse bias across the diode decreases. At a critical value of input voltage which is at a very small positive potential, the dynamic resistance of the diode is sufficiently small to permit the circuit to become unstable. The positive feed-back provided by the transformer 38 forces the transistor to turn off rapidly, generating a sharp output pulse across the secondary of transformer 39. When the input voltage becomes large and positive, the diode 37 is in the low impedance state, and the transistor 36 is maintained in its de-energized state. The circuit is essentially similar in operation to a blocking oscillator. The natural period of the circuit as a blocking oscillator is properly chosen to prevent the generation of more than one output pulse. Further details of the zero crossing detection circuits are set forth on pages 321 and 322 of the Blecher article cited above.

Output pulses from the zero crossing detectors 23 and 24 are applied to the time encoder circuit 13. The time encoder includes a source of pulses and a binary accumulator. Pulses from one of the two zero crossing detectors close an electronic switch, and interconnect the source of pulses and the accumulator. A pulse from the other zero crossing detector opens the electronic switch and stops the operation of the accumulator. The resultant number in the accumulator is directly proportional to the angle $\theta$, at which the input shaft 12 is oriented. An improved time encoder circuit which may be employed with the present apparatus is disclosed in G. Kronacher application Serial No. 457,126, filed September 20, 1954, which is entitled "Time Interval Encoder."

Fig. 2 shows an alternative dual phase shifting circuit which may be employed in place of the circuits 18 and 19 of Fig. 2. The summing amplifiers 21 and 22 are also included in Fig. 2. One of the phase shifting circuits of Fig. 2 includes the capacitor 45 and the resistor 46. The other phase shifting circuit includes the inductor 47 and the resistor 48. As in the case of the phase shifting circuits 18 and 19 of Fig. 1, the resistances 46 and 48 in the two different phase shifting circuits are equal, and the reactive impedances are equal to the resistive impedances at the frequency of the standard signal source 14.

Fig. 3 is a vector diagram which is useful in explaining the mode of operation of the circuit of Fig. 2. The sine and cosine voltages $e_s$ and $e_c$ which are applied to the dual phase shifting circuits of Fig. 2 are shown in Fig. 3 as the vertical vectors 49 and 50, respectively. It may be recalled that the voltages $e_c$ and $e_s$ are in phase, and vary in their relative magnitudes in accordance with the sine and cosine of the angle $\theta$ of the input shaft 12.

To appreciate the significance of the vector diagram of Fig. 3, the mode of operation of the amplifiers 21, 22 should be noted. The open loop amplification factor of each of the summing amplifiers 21, 22 is very large and negative, and the open loop input impedances are low. Consequently, the voltages at the summing nodes $s_1$ and $s_2$ are virtually zero, and the open loop input currents of the amplifiers are nearly zero. The output voltages $e_1$ and $e_2$ are proportional to the currents $i_1$ and $i_2$, respectively, and are one hundred and eighty degrees out of phase with them.

Now, considering the operation of the phase shifter including the capacitor 45 and the resistor 46, the resultant current $i_1$ at the summing node $s_1$ may be determined by combining vectors. The current in the resistor 46 is in phase with and is proportional to the applied voltage $e_c$. The vector 50 in Fig. 3 is therefore employed to represent the fraction of the current $i_1$ derived from voltage $e_c$ through resistor 46, as well as the voltage $e_c$. The current vector 51 derived from the voltage vector 49 (representing $e_s$) is shifted ninety degrees by the capacitive reactance of the capacitor 45. The vector combination of the currents represented by the current vectors 50 and 51 is indicated by the vector designated $i_1$ in Fig. 3. Similarly, the current $i_2$ in Fig. 2 is the vector combination of the current vector 50 and the current vector 52 which is rotated ninety degrees from the voltage vector 49 by the inductive reactance of the coil 47.

As mentioned above, the output voltages from the summing amplifiers are shifted in phase by one hundred and eighty degrees with respect to the input currents. Accordingly, the summing amplifier 21 rotates the current vector $i_1$ to the position designated $e_1$ in Fig. 3. Similarly, the vector $i_2$ is rotated to the vector position $e_2$ in Fig. 3 after passing through the summing amplifier 22. With reference to the vector 54 representing $-e_c$, the voltages $e_1$ and $e_2$ are displaced in opposite directions by an angle equal to $\theta$. Accordingly, and as indicated in the vector diagram of Fig. 3, the angle between vectors $e_1$ and $e_2$ is equal to $2\theta$, which is twice the angular rotation of the input shaft 12.

The output number produced by the time encoder 13 is therefore proportional to the angular position of the shaft 12. Although some ambiguity is introduced by the duplicate readings which occur at positions of the shaft 12 which are spaced from each other by one hundred and eighty degrees, this ambiguity may be readily resolved in any one of several ways. For example, an additional coarse analog-to-digital converter, which distinguishes between the alternative positions, may be employed.

The effect of a slight change in the frequency of the standard signal source 14 will now be explained in connection with Fig. 4. In Fig. 4, the input voltages 49 and 50 representing $e_s$ and $e_c$ are the same as in Fig. 3. Assuming that the frequency of the source 14 is increased slightly, the reactance of the capacitor 45 is decreased, while the resistance of the resistor 46 remains unchanged. The current vector 61 is therefore slightly increased in length, and the angle between vector 50 and the resultant current vector 62 is substantially increased. Following the summing amplifier 21, the vector 62 appears as voltage vector 63, in the opposite quadrant. With the increase in frequency mentioned above, the reactance of the coil 47 increases. The vector 64, corresponding to the vector 52 of Fig. 2, is shorter than vector 52 by about the same amount that the vector 61 exceeds vector 51. The vector 65 is the resultant of current vectors 50 and 64. After rotation by one hundred and eighty degrees by the summing amplifier 22, the current vector 65 appears as voltage vector 66. The angle between the vector 66 and the vector 54 (representing $-e_c$) is less than $\theta$, whereas the angle between vector 54 and the vector 63 is greater than $\theta$. However, because the increase in one angle is almost exactly equal to the decrease in the other angle, the total phase shift between the two vectors is still very nearly equal to $2\theta$.

In the preceding paragraph, the action of the dual phase shifter in reducing errors resulting from frequency shifts has been demonstrated. If a single phase shifting circuit were employed, the error in angle would correspond to the displacement of one of the vectors 63 or 66 from its proper position, as indicated in Fig. 3. Thus, by providing a dual phase shifter in which both of the output signals are either advanced or retarded, compensations are effected which greatly reduce errors caused by frequency shifts. To indicate how this factor affects design tolerances, it will be assumed that an error of .001 radian, or 3.5 minutes of arc, is the maximum which may be tolerated. With this restriction, the maximum allowable frequency shift for a system employing a single phase shifter is 0.1 percent, as compared with a frequency shift of 4.7 percent which may be tolerated in a system employing two phase shifting circuits. Similar reduction in errors of other types are secured through the use of the two phase shifting circuits. For example, quadrature voltages resulting from imperfections in the resolver or low pass filters 16, 17 may be tolerated to a much greater extent than if only one phase shifting circuit were employed. Assuming again that the error must be limited to less than .001 radian, the quadrature voltage must be less than .1 percent of the reference voltage for the single phase shifting system, and need only be less than 4.5 percent of the reference voltage for the system employing two phase shifting circuits.

Referring to Fig. 1, the phase shifting circuits 18 and 19 may be spaced a considerable distance from the resolver 15. The transmission lines interconnecting these components may pick up a considerable amount of extraneous high frequency distortion signals. It is therefore desirable to introduce the low pass filters 16 and 17 to prevent the transmission of the undesired high frequency signals through the phase shifters where they could cause false operation of the zero crossing detectors. Up to the present time, it has not been considered desirable to use filters at this point in the circuit because of the unpredictable differences in phase shift in the signal voltages which may be produced by the two filters. However, these undesirable phase shifts have little effect on the output of the dual phase shifter because of its low sensitivity to a quadrature voltage component in one of the applied signals.

It is to be understood that the above-described arrangements are illustrative of the application of the principles of the invention. Numerous other arrangements may be devised by those skilled in the art without departing from the spirit and scope of the invention.

What is claimed is:

1. In an analog-to-digital converter, a standard frequency source, a resolver having an analog input shaft and having input terminals coupled to said standard frequency source, said resolver also including means for producing output signals having amplitudes proportional to the sine and cosine of the angle of said analog input shaft, extended transmission lines connected to the sine and cosine output circuits of said resolver, low pass filters connected to said transmission lines, a first phase shifting network for producing an output voltage which has a phase shift in one sense with respect to the phase of said standard frequency source in accordance with the ratio of the amplitudes of the output signals from said low pass filters, a second phase shifting network independent of said first phase shifting network for producing an output voltage which has a phase shift in the opposite sense with respect to the phase of said standard signal source in accordance with the ratio of the amplitudes of the output signals from said low pass filters, each of said phase shifting networks comprising a simple pair of resistance and reactance elements, means for producing pulses corresponding respectively to the instants at which signals from said two phase shifters pass through zero in a predetermined sense, and means for producing a digital representation of the elapsed time between the occurrence of pulses derived from said two phase shifting circuits.

2. In an analog-to-digital converter, a standard frequency source, a resolver having an analog input shaft and having input terminals coupled to said standard frequency source, said resolver also including means for producing output signals having amplitudes proportional to the sine and cosine of the angle of said analog input shaft, a first phase shifting network for producing an output voltage which is shifted in phase in one sense with respect to the phase of said standard frequency source in accordance with the ratio of the amplitudes of the output signals from said resolver, a second phase shifting network for producing an output voltage which is shifted in phase in the opposite sense with respect to the phase of said standard signal source in accordance with the ratio of the amplitudes of the output signals from said resolver, means for producing pulses corresponding respectively to the instants at which signals from said two phase shifters pass through zero in a predetermined sense, and means for producing a digital representation of the elapsed time between the occurrence of pulses derived from said two phase shifting circuits.

3. In a conversion circuit, means for producing two signals which differ in amplitude but which have substantially the same frequency and phase, a first phase shifting circuit connected to said means for producing an output voltage which is shifted in phase in one sense with respect to the phase of said two signals in accordance with the ratio of the amplitudes of said signals, a second phase shifting circuit connected to said means for producing an output voltage which is shifted in phase in the opposite sense with respect to the phase of said two signals in accordance with the ratio of the amplitudes of said two signals, detection means for producing pulses corresponding respectively to the instants at which signals from said two phase shifters pass through zero in a predetermined sense, and means for measuring the elapsed time between the occurrence of pulses derived from said two phase shifting circuits.

4. In combination, a standard source of alternating current signals, means for deriving first and second signals from said standard source of signals, means for varying the relative magnitude of said first and second signals, a first phase shifting network for producing an output voltage which has a phase shift in one sense with respect to the phase of said standard signal source in accordance with the ratio of the amplitudes of said first and second signals, a second phase shifting network for producing an output voltage which has a phase which is shifted in the opposite sense with respect to the phase of said standard signal source in accordance with the ratio of the amplitudes of said first and second signals, and means for measuring the difference in phase between the output signals from said first and second phase shifting networks.

5. In a conversion circuit, first and second coupling circuits, means for producing signals at said first and second coupling circuits which differ in amplitude but which have substantially the same frequency and phase, a first phase shifting circuit including resistive and reactive components connected respectively to said first and second coupling circuits for producing an output voltage which is shifted in phase in one sense with respect to the phase of said signals in accordance with the ratio of the amplitudes of said signals, a second phase shifting circuit including reactive and resistive components identical to said first-mentioned components connected respectively to said first and second coupling circuits for producing an output voltage which is shifted in phase in the opposite sense with respect to the phase of said signals in accordance with the ratio of the amplitudes of said signals, means for producing pulses corresponding respectively to the instant at which the output voltages from said two phase shifting circuits pass through a preassigned voltage level in a predetermined sense, and means for measuring the elapsed time between the occurrence of pulses derived from said two phase shifting circuits.

6. A conversion circuit in accordance with claim 5 wherein said first phase shifting circuit includes a resistor and a capacitor and said second phase shifting circuit includes a resistor and an inductor, said resistors, capacitor, and inductor all having substantially the same value of impedance at the frequency of said signal producing means.

References Cited in the file of this patent

UNITED STATES PATENTS

| | | |
|---|---|---|
| 2,220,201 | Bliss | Nov. 5, 1940 |
| 2,493,508 | Thynell | Jan. 3, 1950 |
| 2,727,224 | Adkins | Dec. 13, 1955 |